March 15, 1955   R. BERANEK   2,704,068
OCCLUSIVE PESSARY
Filed Aug. 17, 1951

Inventor:
Rudolf Beranek

United States Patent Office 2,704,068
Patented Mar. 15, 1955

2,704,068
OCCLUSIVE PESSARY

Rudolf Beranek, Esslingen-Liebersbronn, Germany

Application August 17, 1951, Serial No. 242,268

14 Claims. (Cl. 128—127)

In medical practice, where it is necessary for reasons of health to prevent conception the means chosen is usually an occlusive pessary, even in the light of up-to-date medical research.

Known pessaries have, however, important drawbacks. They consist, generally speaking, of comparatively stiff material like silver or plastic material and can therefore not adjust themselves to the portio of the uterus or to the physiological changes of shape experienced by the portio during intercourse. This not only occasionally leads to erosions of the mucous membranes but also to a comparatively easy slackening of the pessary which is only held by adhesion to the portio of the uterus. Occlusive pessaries of rubber are also known, but these also only remain in place because of adhesion. In order to improve the adhesion action these known rubber pessaries are in general provided with a thick ring reinforcing the rim of the pessary. But also these rubber pessaries are still comparatively too unyielding to adapt themselves to the portio and their adhering action is still not a sufficient one to prevent with certainty a loosening action. The thick rim in addition also contributes to the loosening of the pessary as the phallus is usually not central in the portio but strikes at the side against the thick rim and pushes the pessary away. The known pessaries also have the further drawback that they can only with difficulty be applied manually and even then with little security.

The drawbacks mentioned are obviated by the present invention. By the present invention an occlusive pessary is obtained which satisfies the requirements of a perfect pessary. These are, dependability, harmlessness, and the capability of being easy and sure to introduce besides being of anatomically correct shape and consistency.

For attaining this object the invention consists in that the tip of an occlusive pessary, preferably consisting of soft rubber is kept more resilient, for instance thinner, than the adjoining pessary walls and so forms an easily depressable membrane, whereby, with the insertion of the pessary a vacuum will be created between the portio and the pessary walls as a result of the elastic shaping of the tip, thus bringing about the adhesion of the pessary by a suction action with an action similar to that of a rubber sucker.

According to an additional feature of the invention the tip of the pessary has with advantage a circular ridge surrounding an opening in which to insert the tip of a finger when introducing the pessary by hand. This ridge should face inwardly over the membrane in order to protect this from the outside. It will further be of advantage to provide the ridge at two oppositely situated points with indentations by which the ridge is divided into two equal lips, which, by pressure on both sides of the body of the pessary, will open like a mouth. The insertion of the tip of a finger through the so enlarged opening will be made easier. If the pressure, by letting go the pessary, is removed, the pessary will cling firmly to the finger tip by which a more certain grip on the introductory finger during insertion is ensured.

As by this pressure of the inserting finger acts centrally on the membrane there will, when being inserted, be no material lateral deformation of body of the pessary so that, in contrast to the known roll-like rim reinforcement, the side wall of the body of the pessary can now be kept very thin towards its open annular portion. The pessary is therefor with advantage made thinner towards this end, which reduction in thickness may approach skin thickness, about 0.4 mm. The pessary thus has a high elasticity and fitting capacity and can therefore cling tightly to the inner periphery of the portio to obtain a dependable adhesion. Form and consistency of the portio are thereby fully maintained. The new pessary does not rub or press and thus does not cause erosions nor is it uncomfortable after insertion.

It may be found suitable to make the walls of the pessary at their thin end like a flange by which the adhesion and retention of the pessary is still further improved. Moreover by this a possible turning inwards of the thin rim portion when introducing the pessary becomes impossible. The thin rim portion, bent outward, is very resilient so that the drawbacks of the rather stiff roll rim of the known type of pessary cannot occur.

On account of the discrepancy between the length of the fingers and the depth of the vagina or from ineptness, many women are not in a position themselves to introduce the occlusive pessary and must call on the doctor for assistance. For this reason proposals have also been known to make easier the self-introduction of occlusive pessaries by means of a special introductory instrument. The known instruments are however cumbersome in construction and use as well as their action not being very dependable.

The described new pessary makes possible, as a result of the gripping device arranged centrally on its tip, the particularly simple construction of such an introductory instrument. The instrument consists in that on the front end of a curved rod conforming to the anatomical shape of the vagina, there is a mushroom shaped button for insertion in the opening formed by the circular ridge on the tip of the pessary. This is with advantage surrounded by a saucer serving to support the pessary. The curved rod can as an addition be provided with a hook on its rear end to serve for the removal of the pessary.

The pessary according to the invention was developed over years of experiments and has been medically tested.

The invention will be described further by way of example with reference to the accompanying drawing in which.

Figure 1:
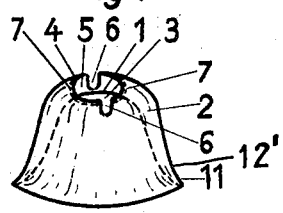
Fig. 1 shows the new occlusive pessary in diagrammatic side view.
Figure 2:
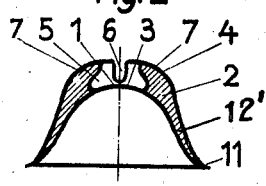
Fig. 2 is an axial longitudinal section through the pessary.

The rounded tip 1 of the elastic, bell-shaped rubber pessary is bell-shaped and is kept thinner and therefore more resilient than the adjoining rounded top wall portion 2 and thus forms an easily depressable membrane 3. The thickness of this membrane corresponds to the requirements obtaining and is with advantage very thin (for instance 0.4 mm.). The tip of the pessary has a circular rim portion 4 surrounding an opening 5 in which to insert the tip of the finger when introducing the pessary. The circular rim portion 4 overhangs the thin membrane 3 and thus partly covers this for its protection. The rim portion 4 is provided at oppositely situated points with recesses 6 which may be fairly deep, preferably until they nearly reach the thin membrane 3. By means of the recesses the circular rim portion 4 is divided into two equal lips 7. Further the circular ridge extends outwards corresponding to the round shape of the body of the pessary so that there are no disturbing projecting parts as on the whole the pessary shows an anatomic shape analogous to the portio vaginalis uteri in relation to the ostium uteri externum.

Figure 3:
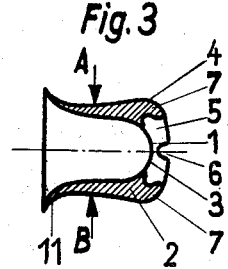
Fig. 3 shows the laterally compressed pessary, also in axial section.
Figure 4:
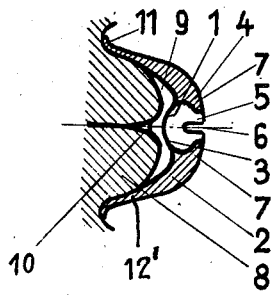
Fig. 4 shows the pessary placed on a schematically indicated portio vaginalis uteri.

When introducing the pessary the body of the pessary is gripped between the thumb and forefinger of the left hand so that the two indentations 6 lie in a plane between the thumb and finger compressing the body of the pessary extending normal to the line of pressure exerted thereby, as shown in Fig. 3. Consequently the lips 7 open like a mouth under the pressure indicated by the arrows A and B in Fig. 3. Now the lower lip is pressed slightly down with the middle or forefinger of the right hand and the finger tip pushed into the expanded finger opening 5 by which the upper lip of the finger opening lays itself on the finger nail. Then the body of the pessary is let go with the left hand so that this again regains its previous shape and the two lips 7 of the finger opening press themselves from both sides against the finger tip. Now the pessary sits fast on the tip of the inserting finger and is thus by hand pushed into the vagina and placed on the portio vaginalis uteri indicated by 8 in Fig. 4.

By the pressure of the finger the membrane 3 is curved forward away from the finger opening 5. After the withdrawal of the finger the membrane tries to return to its original position by which a slight vacuum is caused between the pessary and the portio which leads to a secure adhesion of the pessary to the portio by suctional action on the principle of a rubber sucker. When the occlusive pessary is correctly seated there is no risk of the pessary being retracted when the finger is withdrawn as the wedging effect on the finger is considerably less than the force of adhesion of the pessary to the portio as a result of the suctional action. If the pessary is not properly attached over the portio, the pessary will be withdrawn by the finger as the latter is retracted, this being an indication that due to improper manipulation the attachment of the pessary by suctional force has not resulted.

The method of inserting the pessary by central pressure on its tip makes it possible to do without the hitherto usual and comparative non-yielding thick rim at the open end of the pessary. It is now even possible to keep the side wall portion 12' of the pessary towards its rim portion very thin for which reason, the wall shown in the illustrated example of construction diminishes in thickness towards the rim portion at the open end 11 of the pessary giving the already mentioned advantages. It is also an advantage, for the already mentioned reasons to shape the wall of the pessary at its rim portion 11 outwardly to form a flange.

Figure 5:
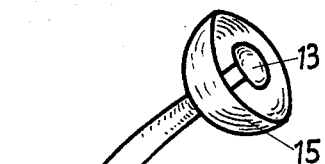
Fig. 5 is a perspective view of an introduction instrument for the pessary.

The introductory instrument shown in Fig. 5 for the new pessary described, consists of a curved rod 12 corresponding to the anatomical shape of the vagina, on the front end of which is situated a mushroom like button 13 which is screwed on to a threaded pin 14 (Fig. 6) projecting from rod 12. The button 13 is surrounded by a substantially hemispherical saucer 15, having an aperture therethrough to accommodate the pin 14 and allowing the button 13 to be screwed to this pin, it thus being attached to rod 12.

Figure 6:
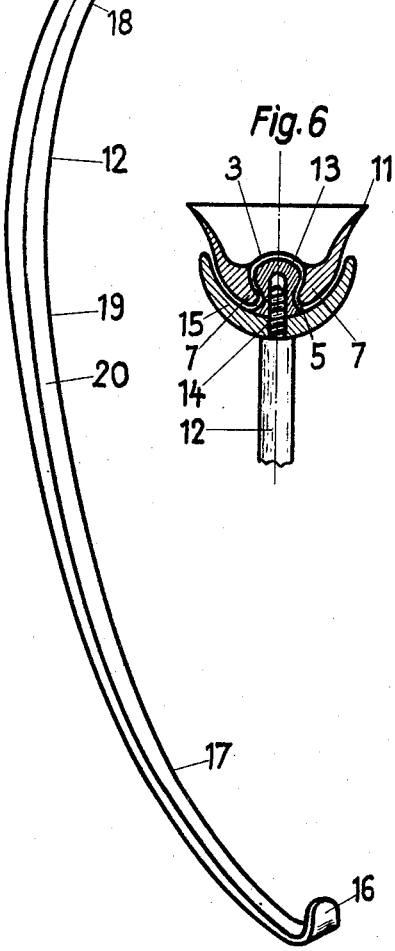
Fig. 6 shows, in axial section, the upper part of the introduction instrument with the pessary attached.

For being fixed on rod 12, the occlusive pessary, as shown in Fig. 3, is laterally compressed, and the lips 7 thereby opening like a mouth are pushed over button 13 and the pessary released. This will now be held in the saucer 15 by the button 13 whereupon membrane 3 is pressed inwardly as shown in Fig. 6. After placing the pessary on the portio, with the withdrawal of probe 12 the membrane 3 tries to return outwards to its original position and therefore the vacuum necessary for the adhesive action is created. The proportion of the width of button 13 to the diameter of opening 5 of the pessary is so chosen that at the withdrawal of rod 12 the lips 7 only open with the exertion of a certain pull which will not normally overcome the suctional adhesion of the pessary and therefore the pessary is released from rod 12. By this suction test a sure check is given that the occlusive pessary is securely seated.

At the rear the rod 12 is bent and thus forms a blunt hook 16 serving to remove the pessary. In order to loosen the pessary from the portio the probe is inserted in the vagina in such a way that the hook 16 reaches behind the rim of the pessary whereupon air enters the vacuum between the pessary and the ostium uteri externum and the pessary frees itself and by means of the hook is further extracted.

The rod 12 should with advantage show a flatter curve at the rear end 17 lying nearest to the hook 16 than at the front part 18 lying nearest button 13. This will render the correct introduction of the hook 16 easier and thereby the release of the pessary. The middle part 19 of the rod 12, which has a curve towards button 13 and is flatter towards the hook, has the shape of a three sided prism. In this way it will be possible to guide the rod with certainty and prevent the lateral turning or tilting of same when being inserted.

When having the described occlusive pessary inserted by the doctor by means of the probe 12 with customary use of a speculum so that the doctor is better able to observe the operation, the saucer 15 on the probe 12 (which saucer is only intended to prevent the pessary from being pulled off the button 13 when inserted without a speculum) may be omitted and only the button 13 be screwed on to the probe.

A number of forms of construction of pessary and introductory instrument differing from the forms of construction described and illustrated are possible within the framework of the invention. The pessary shown preferably consists of a single piece of soft rubber, but it can also be produced from other suitable elastic materials or be composed of sections of different materials, in which connection it always only depends on the tip of the pessary being made resilient in such a way that through the elastic shaping of the tip a vacuum is created when the pessary is applied which leads to a sure adhesion by suction action.

I claim:

1. An occlusive pessary of generally basin shape comprising a resilient annular wall portion, said wall portion being flared and of gradually decreasing thickness at one open end, and a thin membrane of high resilience at the other, smaller, end of said wall portion contiguous with the inner surface thereof effecting closure of said other end, said wall portion extending to form an inwardly shaped circular protuberance defining a pocket above said membrane capable of accommodating a finger tip, said protuberance having diametrically opposed recesses extending part way through the wall thickness from the outer surface thereof so that on applying inward pressure to the wall portion of the pessary the two parts of said protuberance separate to allow ingress of a finger tip which is gripped when said pressure is released and causes said membrane to be convexly deformed within said pessary which can thereupon be fitted over the portio vaginalis uteri and said finger tip withdrawn to allow said membrane to incline to its normal shape thus tending to cause a vacuum between the pessary and the portio vaginalis uteri for retaining the pessary in position by suctional action.

2. A pessary, comprising a tubular member consisting of resilient material and formed with a highly resilient membrane extending transversally across the interior thereof so as to divide the interior of said tubular member into a front compartment and a rear compartment, said front compartment having a diverging rim portion, and said rear compartment having an inwardly projecting rim portion, whereby upon compression of said resilient tubular member in the region of said front compartment thereof, said rear compartment is expanded permitting insertion of a positioning member therein, the positioning member being held in said rear compartment upon release of said compression by the resilient walls of said tubular member, the positioning member being adapted to forwardly displace said resilient membrane while positioning said tubular member with said front compartment thereof over the portio vaginalis uteri, so that upon withdrawal of the positioning member from said rear compartment said resilient membrane will tend to move rearwardly, thereby producing a vacuum in said front compartment for securely holding said tubular member over the portio vaginalis uteri.

3. A pessary, comprising a tubular member consisting of resilient material and formed with a highly resilient membrane extending transversely across the interior thereof so as to divide the interior of said tubular member into a front compartment and a rear compartment, the rim of the wall of said rear compartment being formed with opposite recesses extending axially of said tubular member, whereby upon compression of said resilient tubular member in the region of said front compartment thereof, said rear compartment is expanded permitting insertion of a positioning member therein, the positioning member being held in said rear compartment upon release of said compression by the resilient walls of said tubular member, the positioning member being adapted to forwardly displace said resilient membrane while positioning said tubular member with said front compartment thereof over the portio vaginalis uteri, so that upon withdrawal of the positioning member from said rear compartment said resilient membrane will tend to move rearwardly, thereby producing a vacuum in said front compartment for securely holding said tubular member over the portio vaginalis uteri.

4. A pessary, comprising a tubular member consisting of resilient material and formed with a highly resilient membrane extending transversally across the interior thereof so as to divide the interior of said tubular member into a front compartment and a rear compartment, said front compartment having a diverging rim portion, and said rear compartment having an inwardly projecting rim portion, the rim of the wall of said rear compartment being formed with opposite recesses extending axially of said tubular member, whereby upon compression of said resilient tubular member in the region of said front compartment thereof, said rear compartment is expanded permitting insertion of a positioning member therein, the positioning member being held in said rear compartment upon release of said compression by the resilient walls of said tubular member, the positioning member being adapted to forwardly displace said resilient membrane while positioning said tubular member with said front compartment thereof over the portio vaginalis uteri, so that upon withdrawal of the positioning member from said rear compartment said resilient membrane will tend to move rearwardly, thereby producing a vacuum in said front compartment for securely holding said tubular member over the portio vaginalis uteri.

5. A pessary, comprising a tubular member consisting of resilient material and formed with a highly resilient membrane extending transversally across the interior thereof so as to divide the interior of said tubular member into a front compartment and a rear compartment, said resilient membrane in its normal position having its rearward surface convex toward said rear compartment, whereby upon compression of said resilient tubular member in the region of said front compartment thereof, said rear compartment is expanded permitting insertion of a positioning member therein, the positioning member being held in said rear compartment upon release of said compression by the resilient walls of said tubular member, the positioning member being adapted to forwardly displace said resilient membrane while positioning said tubular member with said front compartment thereof over the portio vaginalis uteri, so that upon withdrawal of the positioning member from said rear compartment said resilient membrane will tend to move rearwardly, thereby producing a vacuum in said front compartment for securely holding said tubular member over the portio vaginalis uteri.

6. An occlusive pessary of generally basin shape, comprising an open end, a closed end and a wall connecting said ends, adapted to fit over the portio vaginalis uteri, said closed end being closed by a membrane of greater resilience than, and thinner than, the adjoining wall portion, contiguous with the inner surface of said wall portion, said adjoining wall portion forming towards the outer surface thereof an annular protuberance overhanging said membrane to form a pocket capable of accommodating a finger tip, said annular protuberance having a pair of diametrically opposed recesses extending part way through the wall thickness from the outer surface thereof, and said membrane being adapted to cause a vacuum between the pessary and the portio vaginalis uteri for retaining the pessary in position by a suctional action.

7. A pessary consisting of an elastic bell-shaped body composed of a rounded top wall portion and an outwardly flaring side wall portion the thickness of which decreases from said top wall portion towards the rim thereof.

8. A pessary consisting of an elastic bell-shaped body composed of a rounded top wall portion of considerable thickness with a cavity therein opening in the outer face of said rounded top wall portion and of an outwardly flaring side wall portion the thickness of which decreases from said top wall portion towards the rim thereof.

9. A pessary consisting of an elastic bell-shaped body composed of a rounded top wall portion of considerable thickness with a cavity therein being smaller than the interior space within said bell-shaped body and opening in the outer face of said rounded top wall portion, and of an outwardly flaring side wall portion the thicknss of which decreases from said top wall portion towards the rim thereof.

10. A pessary consisting of an elastic bell-shaped body composed of a rounded top wall portion and an outwardly flaring side wall portion the thickness of which decreases from said top wall portion towards the rim thereof, said rounded top wall portion formed with a cavity opening in the outer face of said top wall portion and being smaller than the interior space within said bell-shaped body and formed also with a thin membrane between said cavity and the interior space within said bell-shaped body.

11. A pessary consisting of an elastic bell-shaped body composed of a rounded top wall portion and an outwardly flaring side wall portion the thickness of which decreases from said top wall portion towards the rim thereof, said rounded top wall portion formed with a cavity opening in the outer face of said top wall portion and being smaller than the interior space within said bell-shaped body and formed also with a thin membrane between said cavity and the interior space within said bell-shaped body, said thin membrane in its normal position having its rearward surface convex toward said cavity.

12. A pessary consisting of an elastic bell-shaped body composed of a rounded top wall portion and an outwardly flaring side wall portion the thickness of which decreases from said top wall portion towards the rim thereof, said rounded top wall portion formed with a cavity having an opening in the outer face of said top wall portion, said opening having a diameter being smaller than the diameter of said cavity.

13. A pessary according to claim 11 wherein opposite recesses are provided in the edge of the opening in the outer face of said top wall portion of said bell-shaped body.

14. A pessary consisting of an elastic bell-shaped body composed of a rounded top wall portion and an outwardly flaring forwardly directed side wall portion the thickness of which decreases from the top wall portion towards the rim thereof, an annular portion of said side wall portion being bent so as to project outwardly in rearward direction.

References Cited in the file of this patent

UNITED STATES PATENTS

| | | |
|---|---|---|
| 741,345 | Knopf | Oct. 13, 1903 |
| 2,071,248 | Campbell | Feb. 16, 1937 |
| 2,086,344 | Weiner | July 6, 1937 |
| 2,446,724 | Schmitz, Jr. | Aug. 10, 1948 |

FOREIGN PATENTS

| | | |
|---|---|---|
| 463,331 | Germany | July 26, 1928 |
| 594,504 | Germany | Mar. 17, 1934 |